(12) United States Patent
Matsuoka et al.

(10) Patent No.: US 6,444,280 B1
(45) Date of Patent: Sep. 3, 2002

(54) OPTICAL COMPENSATION SHEET, LIQUID CRYSTAL DISPLAY DEVICE, AND LIQUID CRYSTAL COMPOSITION

(75) Inventors: Koushin Matsuoka; Ken Kawata, both of Minami-ashigara (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 09/409,343

(22) Filed: Sep. 30, 1999

(30) Foreign Application Priority Data

Sep. 30, 1998 (JP) .............................. 10-292847

(51) Int. Cl.[7] ...................... G02F 1/1335; C09K 19/38; C09K 19/32
(52) U.S. Cl. ..................... 428/1.3; 428/1.2; 252/299.01; 349/76; 349/117
(58) Field of Search ..................... 252/299.01, 299.4; 428/1.2, 1.3; 349/101, 117, 76

(56) References Cited

U.S. PATENT DOCUMENTS

| | | | |
|---|---|---|---|
| 5,631,051 A | | 5/1997 | Ito .............................. 428/1.1 |
| 5,718,838 A | * | 2/1998 | Okazaki et al. ......... 252/299.01 |
| 5,730,900 A | | 3/1998 | Kawata .................. 252/299.01 |
| 5,747,121 A | * | 5/1998 | Okazaki et al. ............... 428/1.2 |
| 6,034,754 A | * | 3/2000 | Sato et al. .................. 349/102 |
| 6,061,113 A | * | 5/2000 | Kawata ....................... 349/117 |
| 6,245,398 B1 | * | 6/2001 | Matsuoka et al. ............ 428/1.3 |
| 6,338,808 B1 | * | 1/2002 | Kawata et al. ........... 252/299.4 |

FOREIGN PATENT DOCUMENTS

| | | |
|---|---|---|
| DE | 196 23 147 | 12/1996 |
| EP | 0 676 652 | 10/1995 |
| EP | 0 758 013 | 2/1997 |
| EP | 0 864 885 | 9/1998 |

* cited by examiner

Primary Examiner—Shean C. Wu
(74) Attorney, Agent, or Firm—Burns, Doane, Swecker & Mathis, LLP

(57) ABSTRACT

An optical compensation sheet favorably employable for a liquid crystal display has an optical anisotropic layer which is composed of a polymer of a non-chiral discotic liquid crystal compound having a polymerizable group and a chiral compound. The non-chiral discotic liquid crystal compound is preferably aligned at an angle between 45° and 90° to a plane of the compensation sheet and under a twisted orientation at an angle between 90° and 360°.

9 Claims, 1 Drawing Sheet

OPTICAL COMPENSATION SHEET, LIQUID CRYSTAL DISPLAY DEVICE, AND LIQUID CRYSTAL COMPOSITION

FIELD OF THE INVENTION

The present invention relates to an optical compensation sheet, a liquid crystal display device employing the same, and a liquid crystal composition employed for forming an optical anisotropic layer of the compensation sheet.

BACKGROUND OF THE INVENTION

A liquid crystal display device (often referred to as "LCD") comprises a liquid crystal cell, a couple of polarizers, and one or two optical compensation sheets (i.e., optical retardation films) provided between the polarizers. The liquid crystal cell comprises liquid crystal molecules, two substrates between which the molecules are placed, and electrode layers for applying voltage to the molecules.

Owing to birefringence of the liquid crystal molecules, an LCD is liable to give an image colored in yellow or yellowish green. This coloring is undesired in either monochromatic or full-color display, and hence an optical compensation sheet is usually provided to LCD. The optical compensation sheet prevents the display from coloring so as to give a clear bright image, and further it often serves for expanding the viewing angle of LCD.

In place of a conventional optical compensation sheet of stretched birefringence film, a new kind of compensation sheet has been proposed and practically employed. In this sheet, an optical anisotropic layer comprising a liquid crystal compound (e.g., a discotic liquid crystal compound) is provided on a transparent support. The optical anisotropic layer is formed, for instance, by aligning (or orienting) the discotic liquid crystal compound molecules and fixing the alignment on the support. Since the discotic liquid crystal compound generally has a large refractive index of birefringence and shows various alignment forms, it can provide an optical compensation sheet having characteristics which are not given by the conventional stretched birefringence film. The compensation sheet employing a discotic liquid crystal compound is described in, for example, Japanese Patent Provisional Publication No. 6-214116, U.S. Pat. Nos. 5,583,679 and 5,646,703, and German Patent No. 3,911,620 A1. The discotic liquid crystal compounds are described in, for example, C. Destrad, et al., "Mol. Cryst. Liq. Cryst." 71(1981), pp. 111; B. Kohne et al., "Angew. Chem." 96(1984), pp. 70; J. M. Lehn, et al., "J. Chem. Soc. Chem. Commun." (1985), pp. 1794; and J. Zhang and J. S. Moore, "J. Am. Chem. Soc." 116(1994), pp. 2655.

The compensation sheet employing a discotic liquid crystal compound can be used for an LCD of STN or BTN type in which rod-shaped liquid crystal molecules are aligned under a twisted orientation. In an LCD of STN type, the rod-shaped liquid crystal molecules are aligned under a twisted orientation at an angle of 180 to 360° and work under birefringence mode. Therefore, the discotic liquid crystal compound in the compensation sheet for STN-LCD must be homeotropically aligned, and preferably aligned under a twisted orientation having the same angle but in the opposite direction to the alignment of the rod-shaped liquid crystal molecules of the cell. For providing the twisted orientation, a chiral compound is added to a non-chiral discotic liquid crystal compound, or a discotic liquid crystal compound having an asymmetric carbon alone is used [J. Malthete "Mol. Cryst. Liq. Cryst." 64(1981), pp. 233–238].

Various rod-shaped liquid crystal compounds show a twisted orientation (chiral discotic nematic phases) by adding a chiral compound. The pitch of the phase can be adjusted by mixing the chiral compound with a non-chiral discotic liquid crystal compound in a selected amount. The term "chiral discotic nematic phase (discotic cholesteric phase $N_D^*$)" here means a chiral nematic phase of a discotic liquid crystal, which is described in detail in known literatures [e.g., C. Destrade et al., "Phys. Lett." A(1980), 79A (2–3), pp. 189–192].

With respect to non-chiral discotic liquid crystal compounds, however, the methods for forming twisted orientations by adding chiral compounds are disclosed only in the following publications: combinations of ethynylbenzenes and saccharides [Anton Hauser, "J. Master. Chem." 7(1997), pp. 2223–2229], ethynylbenzenes and optical active nitrofluorenones [K. Peaefcke, "Liq. Cryst." 16(1994), pp. 53–65], and optical inactive triphenylenes and optical active triphenylenes [C. Destrade et al., "Phys. Lett." A(1980), 79A(2–3), pp. 189–192 and Japanese Patent Provisional Publication No. 9-26572]. In the publicly known technology, no mentions are given for an optically active or inactive triphenylene compounds having a polymerizable group in its side chain.

Japanese Patent Provisional Publicaton No. 8-95030 discloses a method in which a cellulose derivative is added to an optically active triphenylene compound having a polymerizable group, so as to prevent the liquid crystal phase from being repelled in the alignment procedure.

In the process for producing an optical compensation sheet, it appears necessary for the liquid crystal molecules to be statistically aligned and the alignment should be fixed without changing the alignment. It is discovered that although the combination of an optically inactive triphenylene compound and an optically active triphenylene compound gives a twisted orientation of liquid crystal phase, it is very difficult to produce a practically satisfactory compensation sheet from that combination. Accordingly, it has been desired to give an optical compensating sheet which shows a stable liquid crystal phase uniformly aligned under a twisted orientation at room temperature.

SUMMARY OF THE INVENTION

An object of the present invention is to provide a liquid crystal composition which forms a stable chiral discotic nematic phase of a twisted orientation.

Another object of the invention is to provide an optical compensation sheet having an optical anisotropic layer.

Further, it is an object of the invention to provide a liquid crystal display device giving an enlarged view angle.

There is provided by the invention an optical compensation sheet having an optical anisotropic layer which comprises a polymer of a non-chiral discotic liquid crystal compound having a polymerizable group and a chiral compound.

In the optical compensation sheet of the invention, the optical anisotropic layer preferably has a chiral discotic nematic phase.

In the optical anisotropic layer, the non-chiral discotic liquid crystal compound is oriented at an angle between 45° and 90° to a plane of the sheet, and can be perpendicularly oriented to a plane of the sheet. Further, the non-chiral discotic liquid crystal compound is preferably oriented under a twisted orientation at an angle between 90° and 360°.

The chiral compound preferably is a chiral discotic liquid crystal compound having no polymerizable group or a chiral non-discotic liquid crystal compound having no polymerizable group.

In the invention, the polymer of a non-chiral discotic liquid crystal compound and a chiral compound are in a weight ratio between 99.9:0.1 and 55:45. The chiral compound is a chiral non-discotic liquid crystal compound having no polymerizable group which has a molecular weight of 300 to 10,000.

In the invention, the non-chiral discotic liquid crystal compound preferably has a triphenylene skeleton in its chemical formula. Representatives of the preferred non-chiral discotic liquid crystal compound having a triphenylene skeleton are represented by the following formula (1):

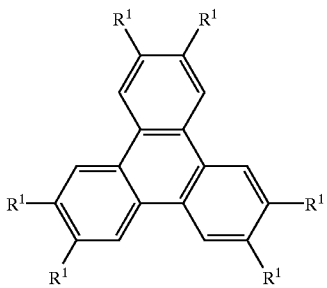

in which $R^1$ stands for a substituent of —$(L^1)a$—Ar—$(L^2)b$—$Z^1$ wherein each of $L^1$ and $L^2$ independently is a divalent linkage group, Ar is a phenyl group or a cinnamoyl group, $Z^1$ is a polymerizable group, and each of a and b independently is an integer of 1 to 20.

It is preferred that the optical compensation sheet of the invention further has an orientation layer arranged on a transparent support film, and wherein the non-chiral discotic liquid crystal compound is oriented at an angle between 45° and 90° to a plane of the orientation layer. Further, the non-chiral discotic liquid crystal compound is oriented under a twisted orientation at an angle between 90° and 360°.

The optical compensation sheet of the invention can be prepared by the steps of:

coating a solution containing the non-chiral discotic liquid crystal compound having a polymerizable group and the chiral compound on the orientation layer of the support;

heating the coated solution so that the non-chiral discotic liquid crystal compound would be aligned at an angle between 45° and 90° to a plane of the orientation layer and under a twisted orientation at an angle between 90° and 360°; and polymerizing the liquid crystal compound keeping the alignment.

The liquid crystal composition which is preferably employed for preparing an optical compensation sheet of the invention comprises a non-chiral discotic liquid crystal compound having a polymerizable group, a chiral discotic compound having no polymerizable group or a chiral non-discotic compound having no polymerizable group, and a polymerization initiator, and has a chiral discotic nematic phase.

DETAILED DESCRIPTION OF THE INVENTION

Figure 1:
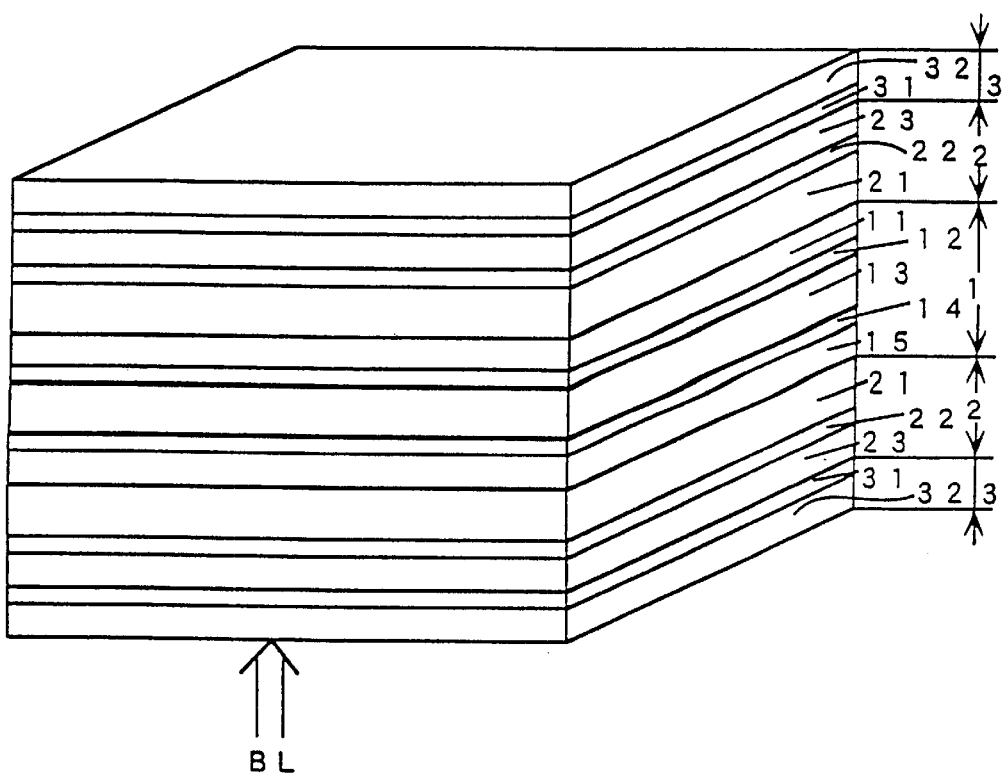
FIG. 1 is a sectional view schematically illustrating a preferred embodiment of an STN liquid crystal display device according to the invention.

In the present invention, a composition containing both a chiral compound and a non-chiral discotic liquid crystal compound having a polymerizable group is used instead of using a chiral discotic liquid crystal compound having a polymerizable group alone, so as to form a stable discotic nematic phase of a statistically uniform twisted orientation.

Examples of The Chiral Compounds Include:

1) chiral discotic compounds having a polymerizable group, 2) chiral non-discotic compounds having a polymerizable group, and 3) chiral compounds having no polymerizable group.

The chiral compounds having no polymerizable group 3) are preferably used for the invention.

First, the non-chiral discotic liquid crystal compound having a polymerizable group is explained below.

The non-chiral discotic liquid crystal compound having a polymerizable group is described in, for example, C. Destrad et al., "Mol. Cryst. Liq. Cryst." 71(1981), pp. 111; Chemical Society of Japan, "Chemical Reviews, Chemistry of Liquid Crystals (Japanese)" 22(1994), Chapter 5 and Chapter 10, section 2; B. Kohne et al., "Angew. Chem." 96(1984), pp. 70; J. M. Lehn et al., "J. Chem. Soc. Chem. Commun." (1985), pp. 1794; and J. Zhang and J. S. Moore, "J. Am. Chem. Soc." 116(1994), pp. 2655.

In order to fix the alignment of the discotic liquid crystal compound by polymerization, a polymerizable group must connect to the nuclear parts of the adjacent compounds indirectly using a substituent which has the polymerizable group at its terminal. If the polymerizable group directly connects to the nuclear parts, the alignment is disturbed in the course of polymerization. Therefore, a linking group must be inserted between the polymerizable group and the nuclear part. The non-chiral discotic liquid crystal compounds having that structure are described in various publications [e.g., Japanese Patent Provisional Publication Nos. 7-306317 and 9-104866], and the polymerization of the compounds is also described in Japanese Patent Provisional Publication No. 8-27284.

Examples of the nuclear parts include benzene ring, triphenylene ring, truxene ring, phthalocyanine ring, porphyrin ring, anthracene ring, azacrown ring, cyclohexane ring, hexaethynylbenzene ring, dibenzopyrene ring, coronene ring, and phenylacetylene-macrocyclic ring. Further, cyclic structures described in "Chemical Review, No. 1, Chemistry of New Aromatic Compounds (Japanese)" 15(1971) [edited by Chemical Society of Japan, published by Tokyo Daigaku Shuppan-kai] and their similar structures (for example, substituted with hetero-atoms) are also usable. Furthermore, a compound whose molecules gather with hydrogen bond or coordination bond to form a cluster of discotic structure [e.g., b-diketone metal complex] is also employable. Preferred is a structure forming a discotic nematic phase. Particularly preferred are benzene ring, triphenylene ring and truxene ring, and triphenylene ring is most preferred. Examples of the nuclear parts are shown below. In the following formulas, each R represents a side chain. If the formula has two or more R, they may be the same as or different from each other (preferably the same).

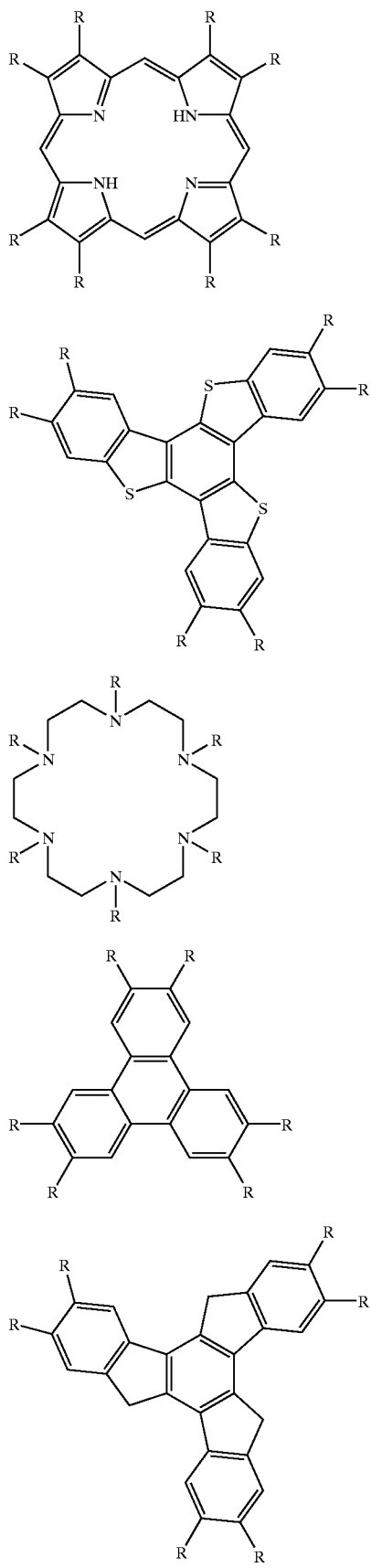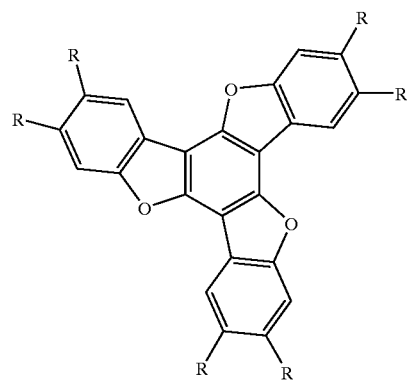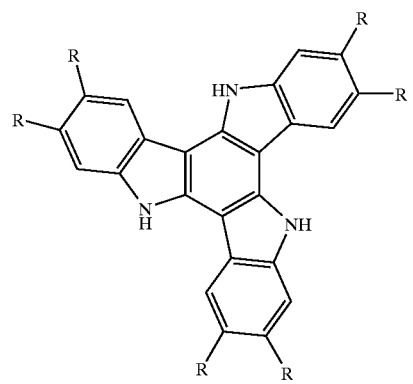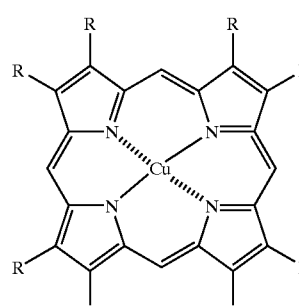

(D10)
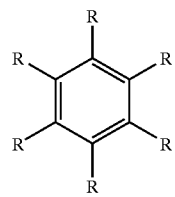

(D11)
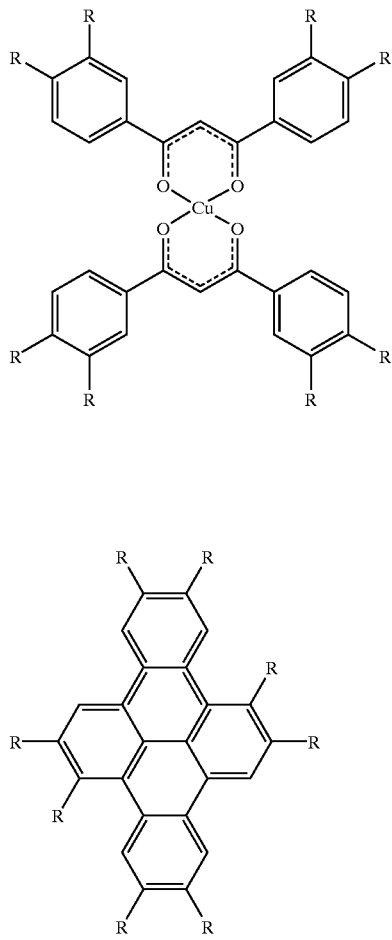

(D12)
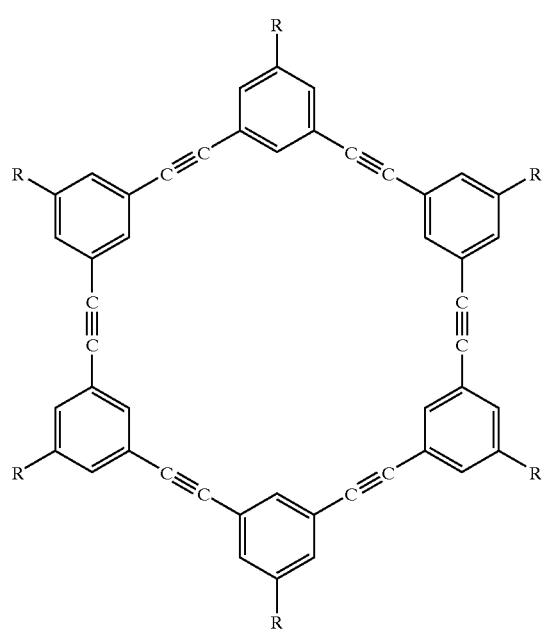

(D13)
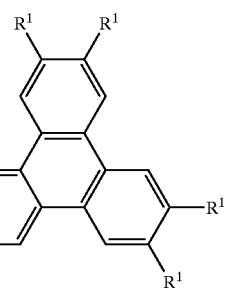

(D14)
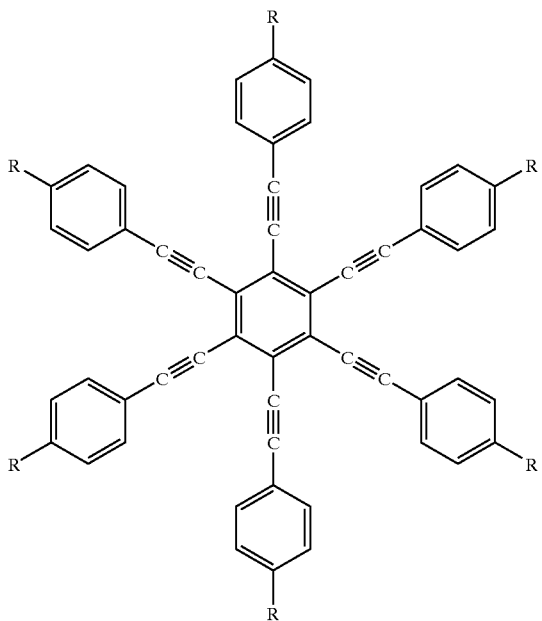

The non-chiral discotic liquid crystal compound having a polymerizable group preferably is a non-chiral discotic compound having a triphenylene skeleton.

Further, the non-chiral discotic compound having a triphenylene skeleton is preferably represented by the following formula (1):

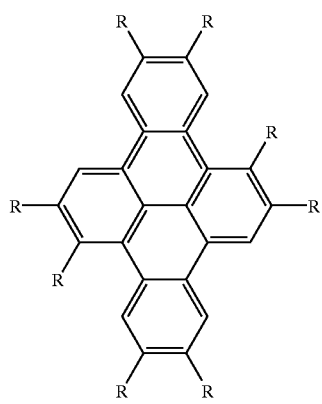

In the formula, $R^1$ is —$(L^1)a$—Ar$(L^2)b$—$Z^1$. If two or more $R^1$ are present in the formula, they may be the same as or different from each other (preferably the same).

$L^1$ is a divalent linking group having 1–25 carbon atoms. The linking group of $L^1$ preferably is a group selected from the group consisting of an alkylene group of 1–12 carbon atoms, a polyoxyalkylene group of 2–12 carbon atoms, an oxycarbonyl group, a carbonyl group, an ether group, a thioether group, a thiocarbonyl thioether group, an oxycarbonylether group, a dicarbonylether group, —NR$^o$—, —C(O)NR$^o$—, —OC(O)NR$^o$—, —OC(O)ONR$^o$—, and —NR$^o$—C(O)—NR$^o$— [in which R$^o$ is a hydrogen atom or an alkylene group of 1–6 carbon atoms]. The linking group of $L^1$ may have a substituent selected from the group consisting of a halogen atom, an alkyl group having 1–6 carbon atoms, an alkoxy group having 1–6 carbon atoms, and an acyloxy group having 2–7 carbon atoms. Preferred examples of $L^1$ are as follows.

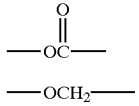
(L1)

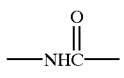
(L2)

(L3)

(L4)

In the formula, Ar preferably is a phenyl group or a cinnamoyl group. Further, other arylene groups shown below are also employable as Ar.

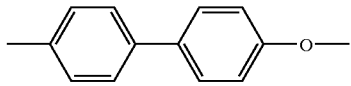
(L8)

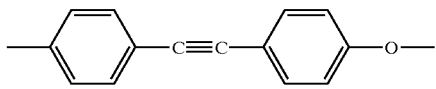
(L9)

$L^2$ is divalent linking group having 1–25 carbon atoms. The linking group of $L^2$ preferably is a group selected from the group consisting of an oxyalkylene group of 1–20 carbon atoms, a polyoxyalkylene group of 2–40 carbon atoms, a thioalkylene group of 1–20 carbon atoms, a dioxyalkylene group of 1–20 carbon atoms, a sulfonylalkylene group of 1–20 carbon atoms, an oxyalkylene group of 3–23 carbon atoms having a vinyl group at its terminal, an alkylenethiomethylene group of 1–20 carbon atoms, a 2-alkylenethioethylene group of 4–12 carbon atoms, a 2-alkylthioethoxymethylene group of 4–12 carbon atoms, a 2-alkoxyethoxymethylene group of 4–12 carbon atoms, a 2-alkoxycarbonylethylene group of 4–12 carbon atoms, a 4-alkyleneoxybenzoyl group of 8–27 carbon atoms, a 4-alkyleneoxybenzoyloxy group of 8–27 carbon atoms, a 4-alkylenebenzoyloxy group of 8–27 carbon atoms, a 2-(4-alkylenephenyl)ethynyl group of 9–28 carbon atoms, a 4-alkyleneoxyphenyl group of 7–26 carbon atoms, and a 4-alkyleneoxyphenoxycarbonyl group of 8–27 carbon atoms.

Particularly preferred are an oxyalkylene group of 1–20 carbon atoms, a polyoxyalkylene group of 2–40 carbon atoms, and a thioalkylene group of 1–20 carbon atoms.

$Z^1$ is a polymerizable group. Examples of $Z^1$ include an alkenylcarbonyloxy group of 1–12 carbon atoms having a double bond at α-position, an alkenyloxy group of 1–12 carbon atoms having a double bond at α-position, an epoxide group of 2–12 carbon atoms, an aziridine group of 2–12 carbon atoms, an isocyanate group, a thioisocyanate group, an ethynyl group, and a formyl group. Preferred are an alkenylcarbonyloxy group of 1–9 carbon atoms having a double bond at α-position, an alkenyloxy group of 1–6 carbon atoms having a double bond at α-position, and an epoxide group of 2–4 carbon atoms. Particularly preferred are an acryloyl group, an vinyloxy group, and an ethylene epoxy group. Preferred examples of $Z^1$ are as follows.

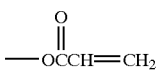
(Z1)

(Z2)

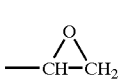
(Z3)

Each of a and b independently is an integer of 1 to 20.

The chiral compound having no polymerizable group is explained below.

The chiral compound having no polymerizable group may be a chiral discotic compound having no polymerizable group or a chiral non-discotic compound having no polymerizable group. They may not form a liquid crystal state, but have an optically active structure. The "chiral discotic compound" here means a compound having both a disc-shaped structure and an optically asymmetric part at its side chain, and the compound may form a discotic liquid crystal state.

The optically active structure may be a structure comprising a group having an asymmetric carbon, or a structure of axial or planar asymmetry.

The structure comprising a group having an asymmetric carbon can be found in natural organic compounds (e.g., amino acids, saccharide, and terpenes), compounds obtained by enzyme reactions, and compounds obtained by optical resolution or asymmetric syntheses. Due to the presence of asymmetric carbon, those compounds have optical activity. The group having an asymmetric carbon may be placed at the side chain of the nuclear part or at the position other than the side chain.

Examples of the compounds having a structure of axial or planar asymmetry include allene, binaphthyl, herisene, and paracyclofune derivatives.

The chiral compound in which the group having an asymmetric carbon is placed at its side chain of the nuclear part is preferably represented by the following formula (2):

(2)

In the formula, the plural groups of $[-L^4-(Ar-O)_p-L^3]$ may be the same as or different from each other (preferably the same). Some of the compounds represented by the formula (2) are described in "Phys. Lett." A(1980), 79A(2–3), pp. 189–192.

In the formula, D represents a nuclear part, and preferably is (D2), (D4), (D5), (D6), (D7), or (D13) illustrated hereinbefore.

$L^4$ is a divalent linking group having 1–25 carbon atoms. The linking group of $L^4$ preferably is a group selected from the group consisting of an alkylene group of 1–12 carbon atoms, a polyoxyalkylene group of 2–12 carbon atoms, an oxycarbonyl group, a carbonyl group, an ether group, a thioether group, a thiocarbonyl thioether group, an oxycarbonylether group, a dicarbonylether group, $-NR^0-$, $-C(O)NR^0-$, $-OC(O)NR^0-$, $-OC(O)ONR^0-$, and $-NR^0-C(O)-NR^0-$ [in which $R^0$ is a hydrogen atom or an alkylene group of 1–6 carbon atoms]. The linking group of $L^4$ may have a substituent selected from the group consisting of a halogen atom, an alkyl group having 1–6 carbon atoms, an alkoxy group having 1–6 carbon atoms, and an acyloxy group having 2–7 carbon atoms. Preferred examples of $L^4$ are as follows.

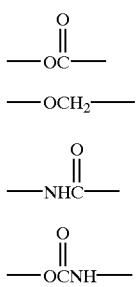
(L1)

—OCH$_2$— (L2)

(L3)

(L4)

In the formula (2), Ar is phenyl group or cinnamoyl group, and p is an integer of 0 or 1.

The group of $L^3$ has 1–10 asymmetric carbons, and is a cyclic alkyl group or a linear alkyl group of 1–20 carbon atoms having a branched chain, or an alkenyl or alkynyl group of 1–20 carbon atoms. A substituent may connect to at least one asymmetric carbon. There is no specific restriction on the position of the asymmetric carbon, provided that the group has an optical activity. Either (R)- or (S)-isomer can be used. The number of asymmetric carbons preferably is in the range of 1 to 10, more preferably 1 to 3, and most preferably 1. Examples of the substituents connecting to the asymmetric carbon include an alkyl group having 1–6 carbon atoms, an aryl group having 6–26 carbon atoms, an alkoxy group having 1–6 carbon atoms, an acyloxy group having 1–6 carbon atoms, a halogen atoms, a trifluoromethyl group, a phenyl group, a hydroxyl group, and a cyano group. Particularly preferred are methyl, ethyl, propyl, phenyl, cyano, methoxy, a halogen atom, and trifluoromethyl. In the formula (2), k is an integer of 1 to 20 (preferably 6 to 8).

The chiral compound in which the group having an asymmetric carbon is placed at the position other than the side chain is preferably represented by the following formula (3):

$$C\text{—}[\text{—}Y]_y \quad (3)$$

In the formula (3), the plural groups of [—Y] may be the same sd or different from each other (preferably the same). C represents a group having 1—15 asymmetric carbons.

Y represents a group in which a monovalent substituent connects to the right end (i.e., the end not connecting to C) of a linking group selected from the group consisting of an ether group, a carbonyl group, an alkylene group of 1–20 carbon atoms, an alkenylene group of 1–20 carbon atom, a polyoxyalkylene group of 2–20 carbon atoms, an arylene group of 6–20 carbon atoms which may have a substituent, a thioether group and a divalent amino group. The linking group may be combined with two or more which are selected from the above group. There is no specific restriction on the monovalent substituent, but preferred are a hydrogen atom and hydrocarbon groups such as methyl and phenyl.

In the formula (3), y is an integer of 1 to 20 (preferably 1 to 10).

Examples of the groups Y are illustrated below:

—OCO(CH$_2$)$_2$CH$_3$ (L10)

—OCO(CH$_2$)$_3$CH$_3$ (L11)

—OCO(CH$_2$)$_4$CH$_3$ (L12)

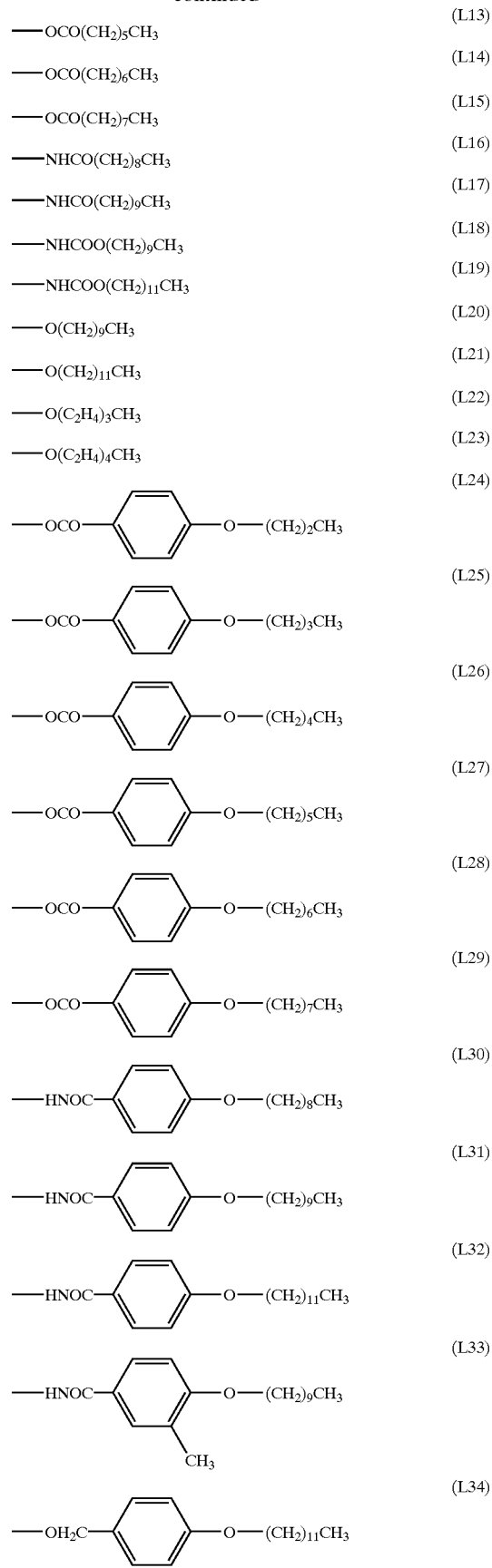

-continued
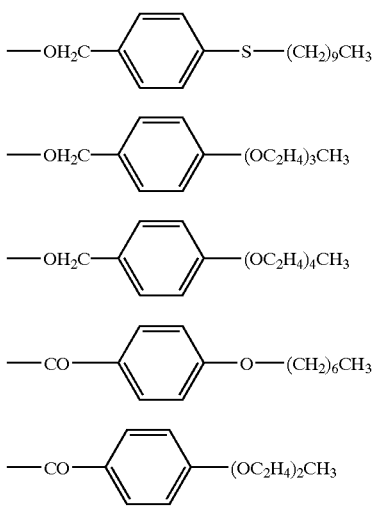
(L35)
(L36)
(L37)
(L38)
(L39)
Examples of the compounds represented by the formula (3) are illustrated below. Each compound has stereoisomers, and any of them can be used.
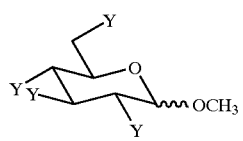
(C1)
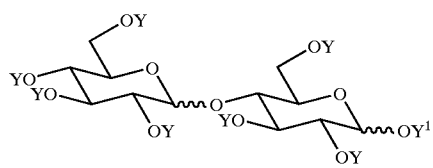
(C2)
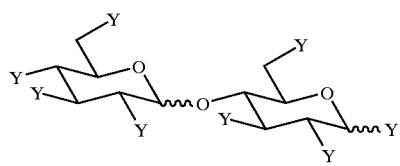
(C3)
In the above-illustrated formula, $Y^1$ may be the same as or different from Y. If it is different from Y, $Y^1$ is an alkyl group of 1–16 carbon atoms.
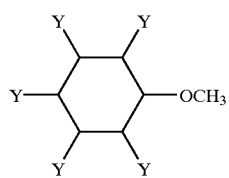
(C4)
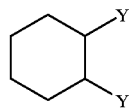
(C5)
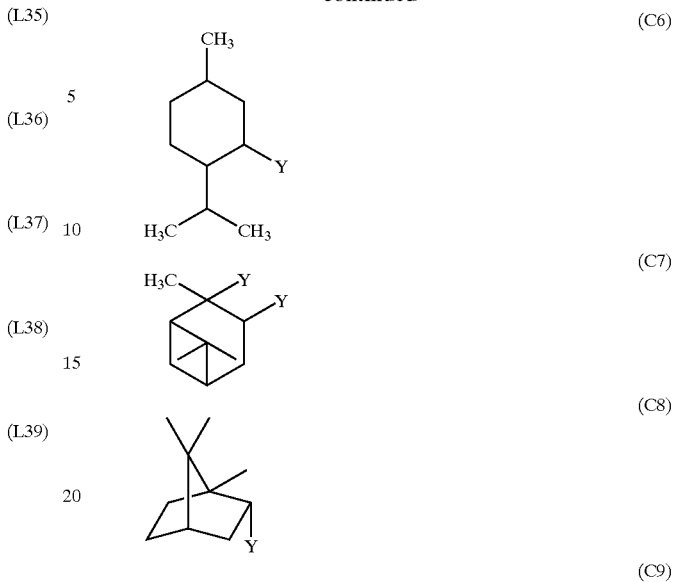
(C6)
(C7)
(C8)
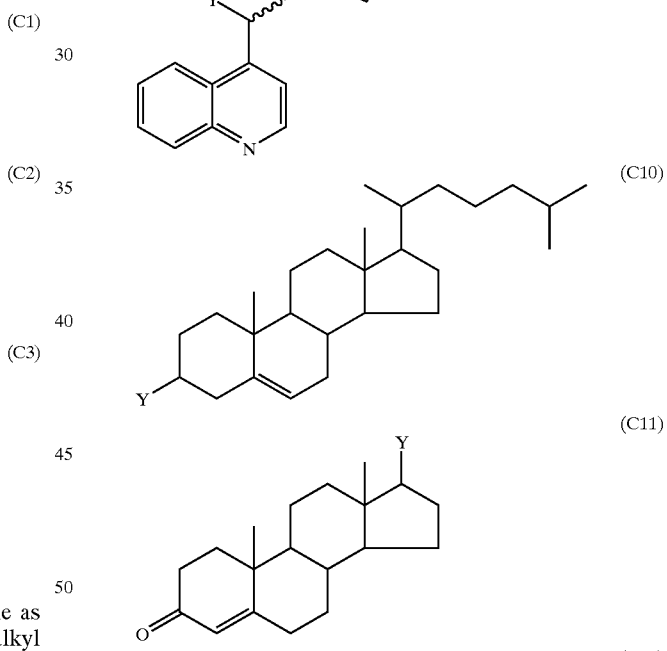
(C9)
(C10)
(C11)
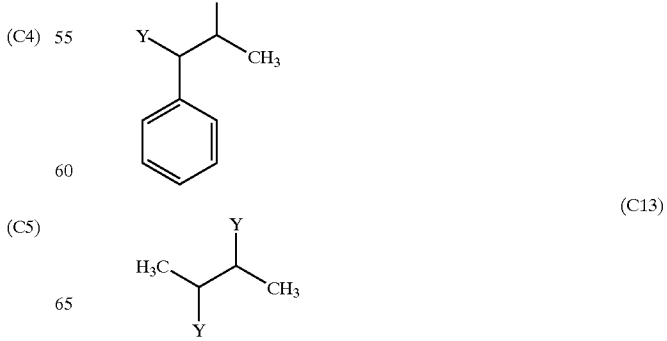
(C12)
(C13)

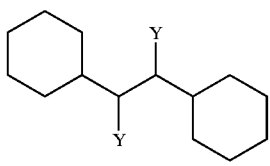 (C14)

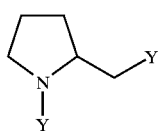 (C15)

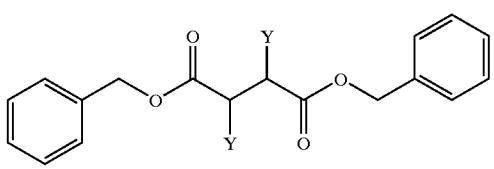 (C16)

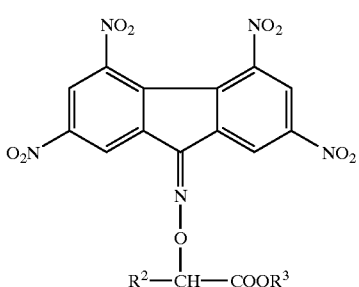 (C17)

In the above-illustrated formula, $R^2$ is an alkyl group of 1–15 carbon atoms (preferably, methyl or ethyl). $R^3$ is a hydrogen atom or an alkyl group of 1–15 (preferably, 3–13) carbon atoms.

Examples of the chiral compound shaving a structure as axial or planar asymmetry are illustrated below:

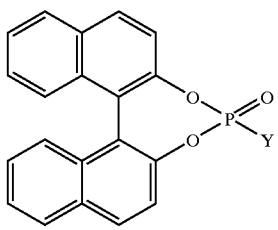 (C18)

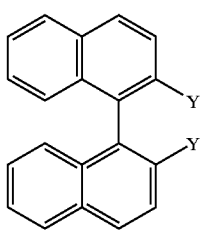 (C19)

In the above-illustrated formula, Y represents the same as those described above.

The optical anisotropic layer is formed in the following manner. First, a coating solution is prepared by mixing a non-chiral discotic liquid crystal compound having a polymerizable group, a chiral discotic or non-discotic compound having no polymerizable group, and if needed, a polymerization initiator or other additives. The coating solution is applied onto an orientation layer (for perpendicular alignment) beforehand formed on a support, and then heated so as to fix the alignment of the non-chiral liquid crystal compound (if the chiral discotic compound is used, its molecules are also aligned). In the course of polymerization of the liquid crystal composition in a chiral discotic nematic phase, the alignment is fixed with no change.

Before fixing the alignment, the non-chiral discotic liquid crystal compound having a polymerizable group must be homeotropically arranged, and preferably aligned in a twisted orientation. The optical compensation sheet of the invention is suitably provided onto a liquid crystal cell of STN or TN type. In that case, the twist angle of the discotic liquid crystal compound is preferably adjusted in the range of 90 to 360°. In particular, in the case of STN type, the twist angle of the discotic liquid crystal compound in the compensation sheet is preferably adjusted within the range of ±10° based on the twist angle (generally 180 to 360°, preferably 180 to 270°) of rod-shaped liquid crystals in the STN liquid crystal cell.

Preferably, the chiral discotic or non-discotic compound having no polymerizable group neither decomposes nor vaporizes during the step of heating for drying, aligning, or polymerizing after applying the coating liquid. The compound, therefore, is preferably stable at a temperature of 80 to 200° C.

As the chiral non-discotic compound, it is not preferred to use cellulose derivatives (described in Japanese Patent Provisional Publication No. 8-95030). The chiral non-discotic compound preferably has a molecular weight of 300 to 10,000, more preferably 300 to 5,000, further preferably 500 to 5,000. If the molecular weight is more than 10,000, the non-chiral discotic liquid crystal compound is hardly aligned.

The weight ratio of the non-chiral discotic liquid crystal compound having a polymerizable group to the chiral discotic or non-discotic compound having no polymerizable group in the coating solution is preferably in the range of 99.9/0.1 to 55/45, more preferably 99.9/0.1 to 80/20.

In preparing the coating solution, organic solvents are preferably used. Examples of the organic solvents include amide solvents (e.g., N,N-dimethylformamide), sulfoxide solvents (e.g., dimethyl sulfoxide), heterocyclic solvents (e.g., pyridine), hydrocarbon solvent (e.g., hexane, benzene), halogenated solvents (e.g., chloroform, dichloromethane), ester solvents (e.g., methyl acetate, butyl acetate), ketone solvents (e.g., acetone, methyl ethyl ketone), and ether solvents (e.g., tetrahydrofuran, 1,2-dimethoxyethane). The coating procedure can be performed in the known manner (e.g., extrusion coating, direct gravure coating, or die coating).

The non-chiral discotic liquid crystal compound having a polymerizable group is fixed in the coating layer with the alignment maintained. This procedure is preferably conducted in the course of polymerization of the polymerizable group, so that the liquid crystal compound may be fixed in the form of polymer of the liquid crystal composition showing a chiral discotic nematic phase. The reaction may be thermal- or photo-polymerization, and the photo-polymerization is preferred. For the photo-polymerization, an initiator is preferably used.

Examples of the photo-polymerization initiators include α-carbonyl compounds (described in U.S. Pat. Nos. 2,367,661 and 2,357,670), an acyloin ether (described in U.S. Pat. No. 2,448,828), aromatic acyloin compounds substituted with an α-hydrocarbon (described in U.S. Pat. No. 2,722, 512), polynuclear quinone compounds (described in U.S. Pat. Nos. 3,046,127 and 2,951,758), a combination of triarylimidazole dimer and p-aminophenyl ketone (described in U.S. Pat. No. 3,549,367), acridine compound and phenazine compound (Japanese Patent Provisional Publication No. 60-105667, U.S. Pat. No. 4,239,850), and oxadiazole compounds (described in U.S. Pat. No. 4,212,970).

The amount of the initiator preferably is in the range of 0.01 to 20 wt. %, more preferably 0.5 to 5 wt. %, based on the solid content of the coating solution.

Preferably, the photo-polymerization is conducted using UV light. The amount of UV light preferably is in the range of 20 mJ to 50 J/cm$^2$, more preferably 100 to 800 mJ/cm$^2$. For accelerating the polymerization, the light may be applied while the coating liquid is heated.

A synthesis example of a chiral compound having no polymerizable group is described below.

SYNTHESIS EXAMPLE 1

Synthesis of 2,3,6,7,10,11-hexa[(+)-3-Methylnonyloxy]triphenylene [Compound (A)]

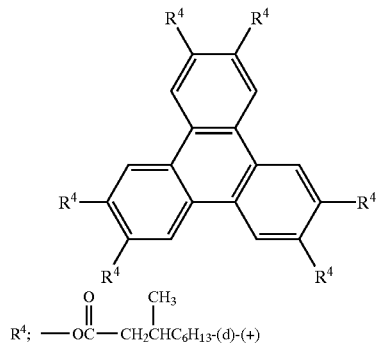

In a three-necked distillation flask, 1.16 mL of methanesulfonyl chloride and 14 mL of tetrahydrofuran (THF) were placed. Independently, 2.58 g of (d)-(+)-3-methylnonylcarboxylic acid and 2.82 mL of diisopropylethylamine were dissolved in 20 mL of THF. The obtained solution was dropwise added under stirring into the flask chilled with ice, and the mixture was stirred for 30 minutes while the flask was chilled with ice. After 2.82 mL of diisopropylethylamine and 0.18 mg of dimethylaminopyridine were added to the solution, 500 mg of hexahydroxytriphenylene dispersed in 8 mL of THF was added. The reaction mixture was stirred for 12 hours at room temperature, and then extracted with ethyl acetate. The ethyl acetate portion was collected, concentrated, and purified by silica-gel column chromatography to obtain 0.53 g of white viscous product (yield: 28%).

$^1$H-NMR (CDCl$_3$) d: 0.90 (18H, t) 1.10 (18H,d) 1.2–1.5 (60H, m), 2.12 (6H, m), 2.40 (6H, dd), 2.63 (6H, dd), 8.22 (6H, s).

EXAMPLE 1

Properties of Liquid Crystal Composition Containing Chiral Compound and Non-chiral Discotic Liquid Crystal Compound Having Polymerizable Group The compound (A), namely (S)-2,3,6,7,10,11-hexa[(+)-3-methylnonyloxy]triphenylene, and the compound (B) shown below, namely 2,3,6,7,10,11-hexa[4-(6-acryloyloxyhexyloxy)benzoyloxy]triphenylene, were mixed in the weight ratios of 50:50 and 10:90, to prepare two compositions. By means of a polarizing microscope, the liquid crystal phase of each composition was observed and found that a chiral discotic nematic phase was formed at a temperature of 92 to 154° C. and 99 to 165° C., respectively. Further, each composition exhibited oily streaks and confirmed that is has a chiral discotic nematic phase.

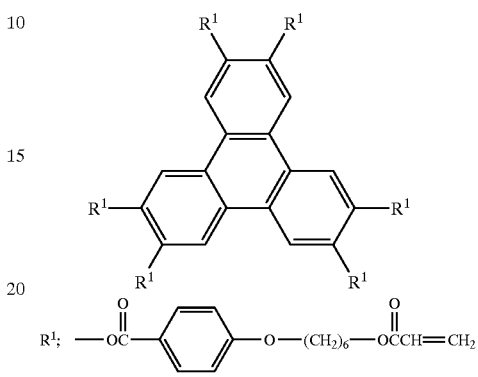

EXAMPLE 2

Production of Optical Compensation Sheet

The compounds (A) and (B) of Example 1 were mixed in a ratio of 9/91. 100 weight parts of the prepared mixture, 0.2 weight part of a photo-polymerization initiator (Irugacure [trade name], Ciba-Geigy), and 85 weight parts of methyl ethyl ketone were mixed to prepare a coating solution. Independently, two glass plates (20 mm×20 mm) having a surface deposited with SiO$_2$ by sputtering were prepared. Onto each glass plate, the coating solution was applied by spin-coating. After drying, the applied solution was heated at 160° C. for 20 minutes so that the compounds (A) and (B) would be homeotropically aligned. UV light was then irradiated at 160° C. for 4 seconds so that the compound (B) would be polymerized to fix the homeotropic alignment. Thus, two optical compensation sheets having an optical anisotropic layer in which the compound (B) was aligned in a homeotropic or twisted orientation was produced.

The twist angle of the sheet was measured in the following manner. A polarized ray was projected to the sheet through the glass plate at the incident angle of 45° based on the deposited direction. The polarization of the ray coming out of the sheet was analyzed by means of a multi-channel photo-analyzer [available from Ohtsuka Electronics Co., Ltd.]. Thus, the twist angle was found in the range of 220 to 250°.

EXAMPLE 3

By using the optical compensation sheets of Example 2, the STN liquid crystal display device shown in FIG. 1 was produced.

In FIG. 1, the numerals denote the following: 1 (liquid crystal cell), 2 (optical compensation sheet), 3 (polarizer), 11 (upper substrate of liquid cell), 12 (orientation layer of liquid cell), 13 (rod-shaped liquid crystal compound), 14 (orientation layer of liquid cell), 15 (lower substrate of liquid cell), 21 (optical anisotropic layer), 22 (orientation layer for providing perpendicular orientation), 23 (transparent support), 31 (polarizing layer), 32 (protective layer), BL (back light).

At the interface between the liquid crystal cell 1 and the optical compensation sheet 2, aligning directions of rod-shaped liquid crystal compounds 13 (in the cell 1) and the discotic liquid crystal compound B (in the sheet 2) were made to be parallel. The angle between the aligning direction of the rod-shaped liquid crystal 13 and the absorption axis of the front polarizer (through which light comes out) was set at 45°. The absorption axes of the front and back (incident) polarizers were placed at a right angle.

The produced LCD of STN type exhibited normally black mode while a voltage was applied. The viewing angle giving a contrast ratio of 5 or more was measured and found more than 120° (vertically) and more than 150° (horizontally). This indicates that the optical compensation sheet remarkably enlarges the viewing angle.

What is claimed is:

1. An STN liquid crystal display device equipped with an optical compensation sheet having an optical anisotropic layer which comprises a chiral discotic liquid crystal compound having no polymerizable group and a polymer of a non-chiral discotic liquid crystal compound having a polymerizable group, wherein the optical anisotropic layer has a chiral discotic nematic phase, and wherein the non-chiral discotic crystal compound is oriented under a twisted orientation at an angle between 90° and 360°.

2. The STN liquid crystal display device of claim 1, wherein the non-chiral discotic liquid crystal compound is oriented at an angle between 45° to 90° to a plane of the sheet.

3. The STN liquid crystal display device of claim 1, wherein the non-chiral discotic liquid crystal compound is perpendicularly oriented to a plane of the sheet.

4. The STN liquid crystal display device of claim 1, wherein the polymer of the non-chiral discotic liquid crystal compound and the chiral discotic liquid crystal compound are in a weight ratio between 99.9:0.1 and 55:45.

5. The STN liquid crystal display device of claim 1, wherein the chiral discotic liquid crystal compound has a molecular weight of 300 to 10,000.

6. The STN liquid crystal display device of claim 1, wherein the non-chiral discotic liquid crystal compound has a triphenylene skeleton in its chemical formula.

7. The STN liquid crystal display device of claim 6, wherein the non-chiral discotic liquid crystal compound having a triphenylene skeleton is represented by the following formula (1):

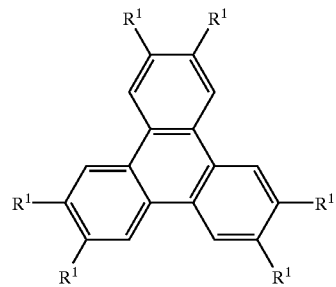

in which $R^1$ is a substituent of —$(L^1)a$—Ar—$(L^2)b$—$Z^1$ wherein each of $L^1$ and $L^2$ independently is a divalent linkage group, Ar is a phenyl group or a cinnamoyl group, $Z^1$ is a polymerizable group, and each of a and b independently is an integer of 1 to 20.

8. The STN liquid crystal display device of claim 1, wherein the optical compensation sheet further has an orientation layer arranged on a transparent support film, and wherein the non-chiral discotic liquid crystal compound is oriented at an angle between 45° and 90° to a plane of the orientation layer.

9. The STN liquid crystal display device of claim 8, wherein the optical compensation sheet is formed by the steps of:

coating a solution containing the non-chiral discotic liquid crystal compound having a polymerizable group and the chiral discotic liquid crystal compound on the orientation layer of the support;

heating the coated solution so that the non-chiral discotic liquide crystal compound would be aligned at an angle between 45° and 90° to a plane of the orientation layer and under a twisted orientation at an angle between 90° to 360°; and polymerizing the non-chiral discotic liquid crystal compound keeping the alignment.

* * * * *